(12) United States Patent
Hiramatsu

(10) Patent No.: US 6,186,161 B1
(45) Date of Patent: Feb. 13, 2001

(54) MANIFOLD FOR CHANGE-OVER VALVE

(75) Inventor: Kazuo Hiramatsu, Ibaraki (JP)

(73) Assignee: SMC Corporation, Tokyo (JP)

( * ) Notice: Under 35 U.S.C. 154(b), the term of this patent shall be extended for 0 days.

(21) Appl. No.: 09/292,843

(22) Filed: Apr. 16, 1999

(30) Foreign Application Priority Data

May 14, 1998 (JP) .................................................. 10-132155

(51) Int. Cl.[7] .................................................. F15B 13/43
(52) U.S. Cl. ..................... 137/271; 137/625.64; 137/884
(58) Field of Search .............................. 137/271, 625.64, 137/884

(56) References Cited

U.S. PATENT DOCUMENTS

| | | | |
|---|---|---|---|
| 3,457,943 | * 7/1969 | Kawabata | 137/884 X |
| 3,550,621 | * 12/1970 | Lansky | 137/625.64 X |
| 3,680,589 | 8/1972 | Jeans et al. | |
| 5,529,088 | * 6/1996 | Asou | 137/271 X |
| 5,586,570 | * 12/1996 | Fukano et al. | 137/271 |
| 5,642,756 | 7/1997 | Lawrence et al. | |
| 5,699,834 | * 12/1997 | Hayashi et al. | 137/271 X |
| 5,983,921 | * 11/1999 | Miyazoe et al. | 137/884 X |

FOREIGN PATENT DOCUMENTS

| | | |
|---|---|---|
| 10 62 506 | 7/1959 | (DE) . |
| 1 650 066 | 9/1971 | (DE) . |
| 21 19 224 | 11/1972 | (DE) . |
| 85 10 642 | 2/1986 | (DE) . |

* cited by examiner

Primary Examiner—Gerald A. Michalsky
(74) Attorney, Agent, or Firm—Oblon, Spivak, McClelland, Maier & Neustadt, P.C.

(57) ABSTRACT

For the purpose of obtaining a manifold for a change-over valve capable of corresponding with given situations easily and reliably even when some of piping directions of the change-over valves are different or piping directions are altered during an operation, port surfaces 21, 22 are respectively formed on a front end surface and a bottom surface of a manifold 1, output openings 23a, 23b commonly in communication with output passages 14a, 14b are respectively formed on the port surfaces 21, 22, and a port block 26 having output ports A, B in communication with the output openings 23a, 23b and a closing plate 27 for closing the output openings 23a, 23b are allowed to be selectively mounted.

10 Claims, 3 Drawing Sheets

MANIFOLD FOR CHANGE-OVER VALVE

FIELD OF THE INVENTION

The present invention relates to a manifold for change-over valve to be used with the change-over valve mounted thereon.

PRIOR ART

For example, when integrally controlling a plurality of change-over valves that switch passages of a working fluid such as compressed air, conventionally, the change-over valves are mounted altogether on an integral type manifold capable of having a plurality of change-over valves mounted thereon, or each of the change-over valves is individually mounted on a separate type manifold and a plurality of such manifolds are joined together to be integrated.

Output ports are formed in the manifold, and piping in tubes in communication with actuators such as an air cylinder are connected to the output ports. However, generally, in the case of an integral type manifold, output ports corresponding to each of the change-over valves are intensively provided in the front end surface of the body. In the case of a separate type manifold, the ones of the same construction with output ports in the front end surface are joined together to be used.

However, depending on how manifolds are placed or where actuators are placed, the directions of suitable piping often differ. In such a case, the above-described conventional integral type manifold with output ports all facing in the same direction cannot be used. On the other hand, in the case of a separate type manifold, manifolds having output ports facing in required directions and also having constructions capable of joining with other manifolds with output ports facing in different directions must be selectively used, which makes an assembly operation extremely difficult. Furthermore, when altering a pipe connection during an operation, the operation gets even more difficult because the manifold has to be replaced with one having different piping directions.

SUMMARY OF THE INVENTION

It is a technological object of the present invention to provide a manifold for a change-over valve which can correspond with given situations easily and reliably even where piping directions are different according to each of the change-over valves or when piping directions are altered during an operation.

In order to achieve the above object, according to the present invention, two port surfaces facing in different directions are formed on a manifold, output openings in communication with output passages are provided in both of the two port surfaces, and a port block having output ports and closing plates closing the output openings are allowed to be selectively mounted on the both port surfaces.

A manifold of the present invention having the above construction is capable of mounting a port block to one of port surfaces and a closing plate to the other port surface, thereby selectively allowing pipe connection to be provided in either of two directions. Therefore, the manifold can correspond with given situations easily and reliably even where piping directions are different according to each of the change-over valves or when piping directions are altered during an operation.

Also, when mounting port blocks to both of the port surfaces respectively, pipe connections can be made in two different directions at the same time.

According to a specific embodiment of a construction of the invention, one of the above two port surfaces is formed on a front end surface of a body, and the other surface is formed on the bottom of the body. In this case, it is preferable that the port surface on the bottom of the body is a recessed portion and a thickness of the closing plate is substantially as large as a depth of the recessed portion, whereby the closing plate can be mounted so as not to protrude from the bottom surface of the body.

Also, it is preferable that the above two port surfaces have the same configuration and the same construction as each other.

According to another specific embodiment of the present invention, the above manifold is a separate type comprising a plurality of manifolds joined together to be used, and has common supply and exhaust passages capable of communicating with other manifolds when joined together.

DESCRIPTION OF THE PREFERRED EMBODIMENTS

Figure 1:
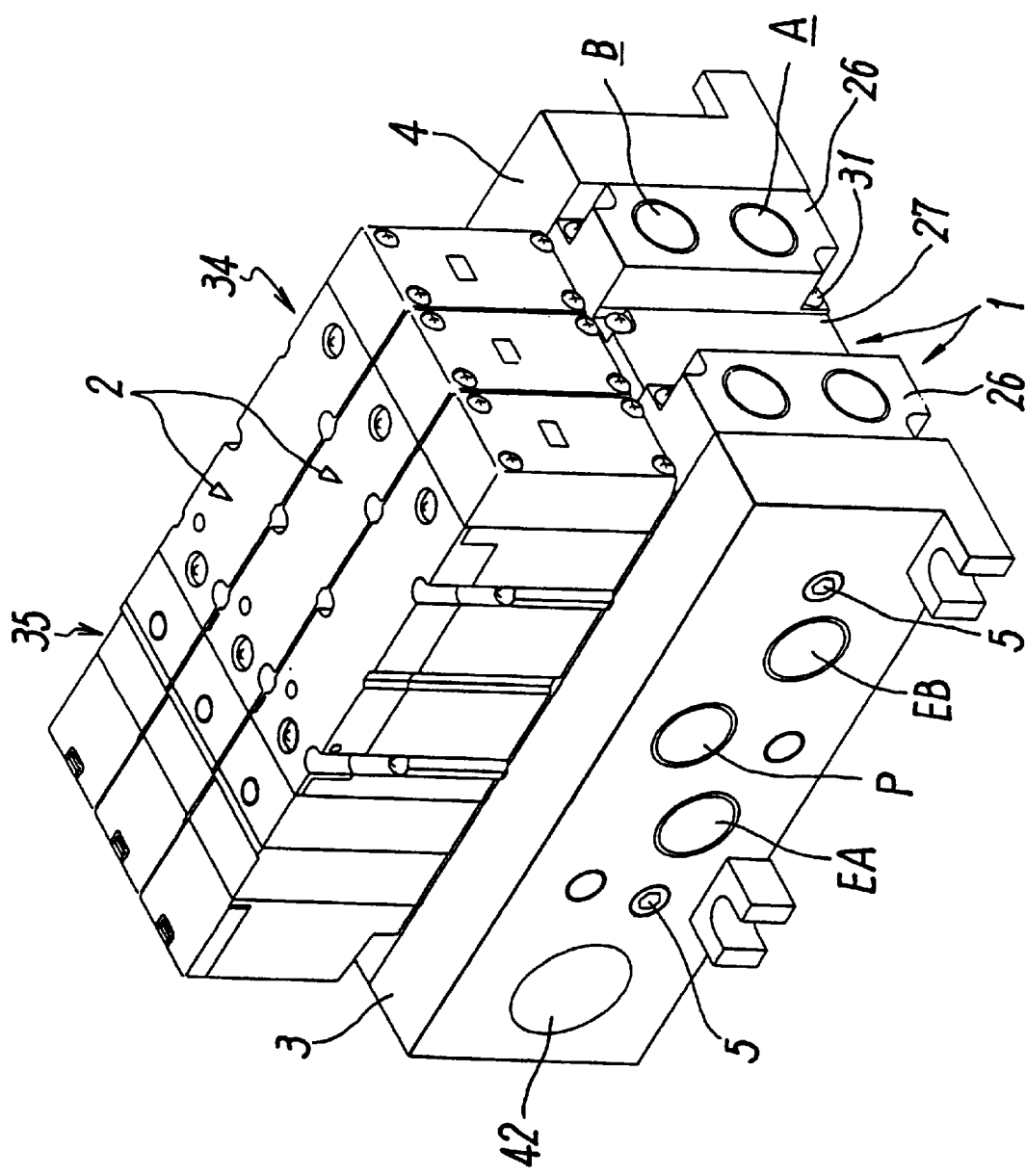
FIG. 1 is a perspective view of a manifold practiced as an embodiment of the present invention.

As a preferred embodiment of the present invention, FIG. 1 illustrates a plurality of separate type manifolds with change-over valves mounted thereon, wherein manifolds are joined together to form a group of change-over valves. In the drawing, reference numeral 1 is a manifold, 2 is a change-over valve mounted on the manifold 1, and reference numerals 3,4 are left and right end blocks disposed to hold the manifold 1 from both sides. The end blocks 3, 4 and each of the manifolds 1 are fastened together by means of fastening bolts 5 passing therethrough to be an assembled into one piece.

Figure 2:
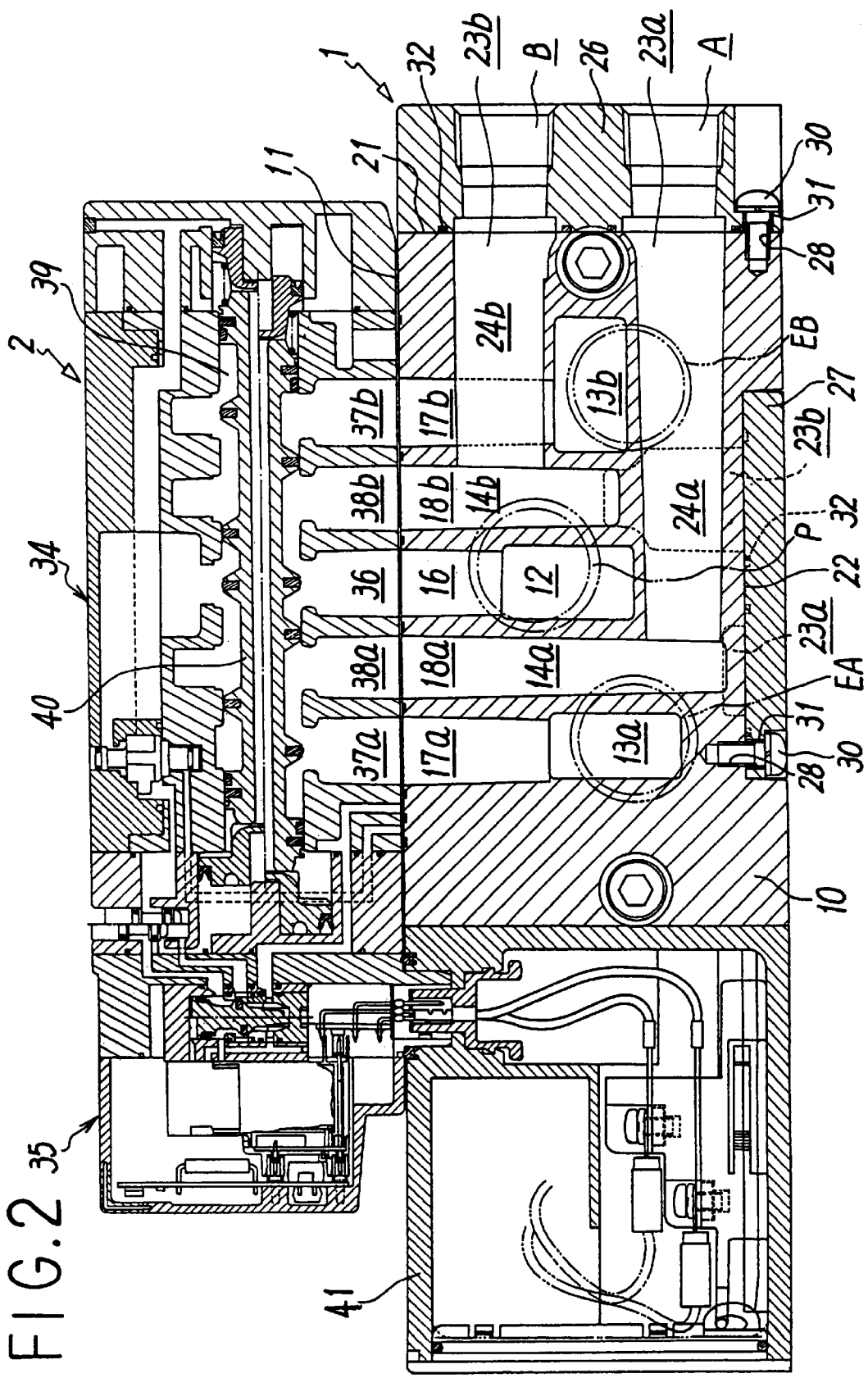
FIG. 2 is a cross-sectional view of the manifold of FIG. 1 having a change-over valve mounted thereon.

As shown in FIG. 2, the above manifold 1 has a parallelepiped body 10 a rectangular section. The body 10 is provided with a valve mounting surface 11 formed thereon for mounting the change-over valve 2. Also, a supply passage 12 for supplying and discharging compressed air, a first and a second exhaust passages 13a, 13b, and a first and a second output passages 14a, 14b are formed inside the body. Each of these passages is in communication with a supply through hole 16 opened in the valve mounting surface 11, a first and a second discharge through holes 17a, 17b, and a first and a second output through holes 18a, 18b, respectively.

The supply passage 12 and two exhaust passages 13a, 13b pass through the body 10 horizontally, being in communication with passages of an adjoining manifold when a plurality of manifolds 1 are coupled to each other horizontally, and being in communication with a supply port P and exhaust ports EA, EB formed in one end block 3.

On the other hand, the two output passages 14a, 14b are formed which are not in communication with the adjoining manifold 1. After extending toward the bottom surface of the body 10 from output through holes 18a, 18b on the valve mounting surface 11, the output passages 14a, 14b communicate with two output openings 23a, 23b on a first port surface 21 formed on the front end surface of the body 10 respectively through communication paths 24a, 24b, and also communicate with two output openings 23a, 23b in a second port surface 22 formed on the bottom surface of the body 10. Forming the two output passages 14a, 14b in such a manner permits increasing the cross-sectional area of the fluid passages, thereby a larger fluid flowing amount is obtained.

The first port surface 21 and the second port surface 22 permit output ports for pipe connection to be formed facing in different directions from each other, have the same configuration and the same construction, and a port block 26 having output ports A, B and a closing plate 27 for closing the output openings 23a, 23b are capable of being selectively mounted to each of the port surfaces 21, 22. Namely, the first output opening 23a and the second output opening 23b are formed in the two port surfaces 21, 22 maintaining the same relative positions, and tapped holes 28 for fastening the port block 26 and the closing plate 27 are formed at the same position. On the other hand, mounting holes 31 in which fastening screws 30 are inserted and a sealing member 32 for providing an adequate sealing around each of the output openings 23a, 23b are provided on the port block 26 and the closing plate 27, maintaining the same relative positions.

Figure 3:
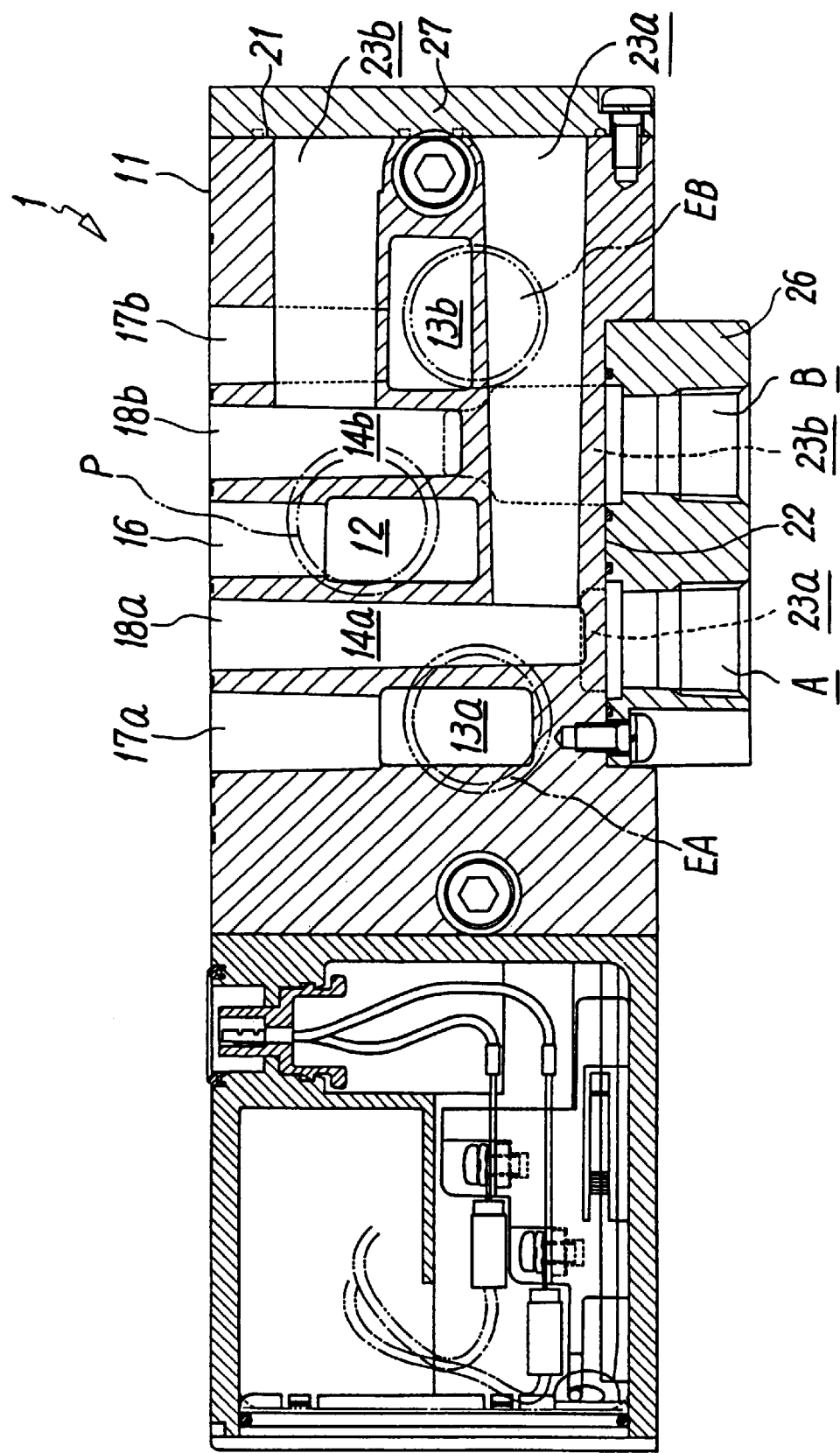
FIG. 3 is a cross-sectional view of the manifold of FIG. 2 with directions of output ports altered.

As shown in FIG. 2, by mounting the port block 26 on the first port surface 21, and the closing plate 27 on the second port surface 22, piping tubes can be connected from a front side. Then, as shown in FIG. 3, the port block 26 is fastened to the second port surface 22 and the closing plate 27 is fastened to the first port surface 21 so that the piping tubes can be connected from the direction of a bottom surface of the manifold 1. Alternatively, by fastening the port block 26 to both the first port surface 21 and the second port surface 22, the piping tubes can be connected from both the front and bottom surfaces of the manifold 1.

Therefore, in a group of change-over valves as shown in FIG. 1, where piping directions of some of change-over valves 2 are different, or when piping directions are altered during an operation, requirements for those situations are fulfilled easily and reliably without replacing a manifold 1 simply by selectively fastening the port block 26 and the closing plate 27 to the first port surface 21 and the second port surface 22.

The second port surface 22 formed in the bottom surface of the body 10 is a recessed portion, and a depth of the recessed portion is substantially as large as a thickness of the closing plate 27, so that the closing plate 27 can be fastened to the second port surface 22 so as not to protrude externally from the bottom surface of the body 10 by making the depth and the thickness the same.

The change-over valve 2 mounted on the manifold 1 is a 5-port electromagnetic pilot type change-over valve, and has a main valve portion 34 for changing over working fluids and an electromagnetically operated pilot valve member 35 for changing over the main valve portion 34. The main valve portion 34 has a supply through hole 36 corresponding individually to each of the above communication holes on the valve mounting surface 11 of the manifold 1, two exhaust through holes 37a and 37b, two output through holes 38a and 38b, a valve hole 39 in which each of the through holes open, and a spool type valve member 40 received slidably in the valve hole 39. Through changing over the valve member 40 by means of a pilot fluid supplied from the pilot valve member 35, passages between each of the through holes are switched to output the working fluid from output ports A, B of the manifold 1.

Incidentally, since the construction of the change-over valve 2 has nothing to do with an argument as to the present invention, further explanation on the change-over valve 2 will be omitted.

In the drawing, reference numeral 41 denotes a wiring box mounted on a rear end surface of the manifold 1, and electric power is supplied to the pilot valve portion 35 of the change-over valve 2 through wiring introduced in the wiring box 41 from a wiring port 42 of the end block 3.

According to an embodiment shown in the drawing, the manifold is constructed such that a 5-port change-over valve is mounted thereon. However, this invention can be applied to manifolds having other constructions, such as ones with change-over valves having another number of ports, including, for example, a 3-port change-over valve and a 4-port change-over valve. In this case, it is a matter of course that the manifold is provided with through holes, passages, output openings or output ports and the like corresponding to the number of ports of each change-over valve.

Also, the present invention can be applied not only to a separate type manifold shown in the above embodiment but also to a single type manifold capable of having one or more of change-over valves thereon.

Thus, according to the present invention, a manifold is constructed such that two port surfaces facing in different directions are formed thereon, and a port block having output ports and a closing plate for closing output openings are selectively mounted. Accordingly, in the case where piping directions of a plurality of change-over valves are different or when piping directions are altered during an operation, requirements for those situations are easily and reliably fulfilled by selectively mounting the port block and the closing plate without replacing the manifold.

What is claimed is:

1. A manifold for a change-over valve comprising:
    a valve mounting surface on which the change-over valve is mounted;
    a plurality of through holes opened in said valve mounting surface;
    supply passages for working fluids in communication with each of said plurality of through holes;
    exhaust passages;
    output passages;
    a first port surface and a second port surface facing in different directions, wherein said first and second port surfaces each have output openings commonly in communication with said output passages;
    a port block having output ports in communication with said output openings; and
    a closing plate for closing said output openings, wherein said port block and said closing plate can be selectively mounted on any one of said first and second port surfaces, respectively, and said second and first port surfaces, respectively.

2. The manifold according to claim 1, wherein said said first port surface is formed on a front end surface of a body of said manifold and said second port surface is formed on a bottom surface of said body of said manifold.

3. The manifold according to claim 2, wherein said first and second port surfaces have a same configuration and a same construction.

4. The manifold according to claim 3, wherein said second port surface formed on said bottom surface of said body of said manifold is a recessed portion, and a depth of said recessed portion and a thickness of said closing plate are substantially equal.

5. The manifold according claim 4, wherein said manifold is a separate type manifold which includes a plurality of manifolds joined together when in use, and said supply passages and said exhaust passages of each of said plurality of manifolds of said separate type manifold exists in common between adjacent manifolds of said plurality of manifolds which are joined to each other in order to communicate therewith.

6. The manifold according to claim 3, wherein said manifold is a separate type manifold which includes a plurality of manifolds joined together when in use, and said supply passages and said exhaust passages of each of said plurality of manifolds of said separate type manifold exits in common between adjacent manifolds of said plurality of manifolds which are joined to each other in order to communicate therewith.

7. The manifold according to one of claim 1 and claim 2, wherein said manifold is a separate type manifold which includes a plurality of manifolds joined together when in use, and said supply passages and said exhaust passages of each of said plurality of manifolds of said separate type manifold exist in common between adjacent manifolds of said plurality of manifolds which are joined to each other in order to communicate therewith.

8. The manifold according to claim 1, wherein said first and second port surfaces having a same configuration and a same construction.

9. The manifold according to claim 8, wherein said second port surface formed on a bottom surface of a body of said manifold is a recessed portion, and a depth of said recessed portion and a thickness of said closing plate are substantially equal.

10. The manifold according to claim 9, wherein said manifold is a separate type manifold which includes a plurality of manifolds joined together when in use, and said supply passages and said exhaust passages of each of said plurality of manifolds of said separate type manifold exist in common between adjacent manifolds of said plurality of manifolds which are joined to each other in order to communicate therewith.

* * * * *